UNITED STATES PATENT OFFICE.

RALPH S. JENNINGS, OF BALTIMORE, MARYLAND.

PROCESS OF PRESERVING FISH.

SPECIFICATION forming part of Letters Patent No. 273,094, dated February 27, 1883.

Application filed August 10, 1882. (No specimens.)

*To all whom it may concern:*

Be it known that I, RALPH S. JENNINGS, of the city and county of Baltimore, of the State of Maryland, have invented a new and useful process of treating salted fish for the destruction of the organic life of alga germs in the salt thereon used in curing such fish; and I do hereby declare the same to be described as follows:

In salt procured by the evaporation of sea-water by solar heat or atmospheric temperature there frequently, if not generally, exist spores or germs of algæ. After this salt has been used in salting cod or other fish the alga germs of it are liable, especially at certain seasons of the year, and under certain conditions, to impart a red color to or cause decomposition of the fish, greatly to the annoyance of and often with much loss to the dealer or holder of the fish.

The purpose of my invention is to render inert or prevent germination of these spores or alga germs after the application to fish of the salt containing them. The process is not for use on fish after their discoloration or decomposition by the alga germs, but is to be employed prior to the occurrence of any such injury, and for the express object of preventing such by destruction of the organic life of such germs. The process is also beneficial to the fish in other respects, particularly in promoting desiccation of them and the salt.

Various attempts have been made to prevent the evil results due to the use in curing fish of salt containing such alga germs, but none, as I am advised, have been of practical value. I have discovered, however, that the germs are rendered inert on exposure to a temperature of about 200° Fahrenheit, or thereabout, without injury to the fish, and with certainty of destruction of the life of the alga germs of the salt used on them for preserving or curing them. Certain chemicals will destroy or properly affect the alga germs of the salt, but will injure the fish, and therefore cannot be used to advantage for such purpose.

My method of treating the salted fish consists in rapidly passing them over a suitably-heated surface, or through or in contact with superheated steam or heated air, so as to simply superficially heat them sufficiently to destroy or kill the alga germs of the salt on their surfaces, the steam or heat not being allowed time to penetrate the fish to an extent to injuriously affect them either for use, storage, or sale. By my process the germs are effectually killed or rendered incapable of germinating and producing the bad effects as hereinbefore stated, the color, appearance, and edible qualities of the fish being in no appreciable or practical degree injured, experts being usually unable to detect any injury.

In carrying out my process, an endless apron of woven wire, and within it a narrow box or receptacle having a foraminous top, may be employed. Into this box or receptacle common air heated to a temperature of 450° Fahrenheit may be forced so as to be discharged from the box or receptacle into and through the meshes of the upper flat portion of the apron and against the fish laid thereon; or, instead of such box, there may be placed within or underneath the apron a foraminous coil or pipe, into and through which superheated steam may be caused to pass at a temperature of about 400° Fahrenheit, such steam being discharged against the fish, while the apron may be revolved on its supporting-rollers at a speed which will cause each of the fish to be exposed for about two seconds of time to the action of the steam or heated air. In some cases coal or wood in combustion, or a heated surface, or a gas-flame may be substituted for the afore-described means of heating by steam or air; but usually, according to my experience, such is not so efficient, and is liable to be productive of injurious effects.

I do not confine my invention to the exact means described for carrying it out, as others may very likely be substituted to advantage; and I would remark that I do not claim boiling salted fish, nor smoking nor drying such, as usually heretofore practiced, by means of air or products of combustion, for the purpose of curing or drying them; nor do I claim merely singeing an animal or article of food, such not being productive of a result or results attainable by my invention.

What I claim as my said invention is—

The process, substantially as described, of treating salted fish for the destruction or killing of the alga germs contained in the salt of such fish, such process consisting in rapidly passing, at or about at a speed as hereinbefore mentioned, the fish over a sufficiently-heated surface, or through or in contact with heated air or superheated steam at or about a temperature of 400° Fahrenheit, so as to superficially heat the fish to an extent required to kill the said germs, without heating the interior of the fish to the injury thereof.

RALPH S. JENNINGS.

Witnesses:
R. H. EDDY,
E. B PRATT.